US012640291B2

(12) United States Patent
Yeh

(10) Patent No.: US 12,640,291 B2
(45) Date of Patent: May 26, 2026

(54) OVERCURRENT PROTECTION ELEMENT

(71) Applicant: THINKING ELECTRONIC INDUSTRIAL CO., LTD., Kaohsiung City (TW)

(72) Inventor: Chuan-Hsun Yeh, Kaohsiung City (TW)

(73) Assignee: THINKING ELECTRONIC INDUSTRIAL CO., LTD., Kaohsiung City (TW)

(*) Notice: Subject to any disclaimer, the term of this patent is extended or adjusted under 35 U.S.C. 154(b) by 453 days.

(21) Appl. No.: 18/237,630

(22) Filed: Aug. 24, 2023

(65) Prior Publication Data

US 2024/0266094 A1 Aug. 8, 2024

(30) Foreign Application Priority Data

Feb. 6, 2023 (CN) ......................... 202310072957.6

(51) Int. Cl.
*H01C 7/02* (2006.01)
*H01C 1/034* (2006.01)

(52) U.S. Cl.
CPC ............. *H01C 7/028* (2013.01); *H01C 1/034* (2013.01)

(58) Field of Classification Search
CPC ................................ H01C 7/028; H01C 1/034
See application file for complete search history.

(56) References Cited

U.S. PATENT DOCUMENTS 6,841,191 B2 * 1/2005 Wu ........................ C25D 5/022 29/613
8,044,763 B2 * 10/2011 Wang .................. H01C 1/1406 338/25

(Continued)

FOREIGN PATENT DOCUMENTS

CN 2470923 Y 1/2002
CN 105970954 A 9/2016

(Continued)

OTHER PUBLICATIONS

CN-105976954 machine translation (Year: 2016).*
TW-202036630 machine translation (Year: 2020).*
TW-1814547 machine translation (Year: 2023).*

*Primary Examiner* — Kyung S Lee
(74) *Attorney, Agent, or Firm* — WPAT, PC

(57) ABSTRACT

Provided is an overcurrent protection element comprising: a core material comprising a top surface, a bottom surface opposite the top surface, a first side surface and a second side surface both located between the top and bottom surfaces, and a first end surface and a second end surface both located between the top and bottom surfaces. A first conductive layer is formed on the top surface of the core material, and a second conductive layer is formed on the bottom surface of the core material. An encapsulation layer covers the first conductive layer, the second conductive layer, and at least one of the side surfaces. A first terminal electrode is electrically connected to the first conductive layer, and a second terminal electrode is electrically connected to the second conductive layer. The overcurrent protection element has excellent electric conductivity, fast response, and sufficient self-protection during soldering process and in use.

14 Claims, 11 Drawing Sheets

(56) References Cited

U.S. PATENT DOCUMENTS

| | | | | |
|---|---|---|---|---|
| 8,198,975 | B2 * | 6/2012 | Sha | H01C 7/027 338/21 |
| RE44,224 | E * | 5/2013 | Wang | H01C 1/1406 252/512 |
| 10,056,176 | B2 * | 8/2018 | Wang | H01C 7/027 |
| 11,626,220 | B2 * | 4/2023 | Li | H01C 1/028 338/22 R |
| 2006/0055501 | A1 * | 3/2006 | Burke | H01C 7/18 338/22 R |
| 2011/0241818 | A1 * | 10/2011 | Sha | H01C 7/027 338/22 R |
| 2017/0018339 | A1 * | 1/2017 | Wang | H01C 7/027 |
| 2022/0399141 | A1 * | 12/2022 | Li | H01C 1/148 |

FOREIGN PATENT DOCUMENTS

| | | | | |
|---|---|---|---|---|
| CN | 105976954 | * | 9/2016 | H01C 7/13 |
| CN | 105976954 A | | 9/2016 | |
| TW | 202036630 | * | 10/2020 | H01C 1/144 |
| TW | I814547 | * | 9/2023 | H01C 7/02 |

* cited by examiner

OVERCURRENT PROTECTION ELEMENT

CROSS-REFERENCE TO RELATED APPLICATION

Pursuant to 35 U.S.C. § 119(a), this application claims the benefits of the priority to China Patent Application No. 202310072957.6, filed Feb. 6, 2023. The contents of the prior application are incorporated herein by its entirety.

BACKGROUND OF THE INVENTION

1. Field of the Invention

The instant disclosure relates to an electronic element, more particularly to an overcurrent protection element.

2. Description of the Prior Arts

A thermistor is a temperature-sensitive protection element that can generally be divided into two types: positive temperature coefficient (PTC) thermistors and negative temperature coefficient (NTC) thermistors. The thermistors exhibit different resistance values under different temperatures and are often connected in series in a circuit. By using thermistors, the startup inrush current can be effectively suppressed. After suppressing the inrush current, a continuous current is utilized to ensure the electronic device is protected from damage, making it a simple and effective measure.

The polymeric positive temperature coefficient (PPTC) is also known as the resettable fuse in the industry of electronic overcurrent and overvoltage protection. The device has soldered electrodes on both ends and a PPTC composite material in the middle, which is formed by a polymer and conductive filler. Individual PPTCs are made by cutting large blocks of material, which inevitably results in performance defects due to this manufacturing process. Specific defects are explained below based on two publicly disclosed technical documents.

China patent publication No. CN2470923Y, published on Jan. 9, 2002, discloses a surface adhesive electrical device. Since it is necessary to form an electrical connection on the end faces of the layered-structure of the individual devices (see FIG. 1 of CN2470923Y for the layered-structure), corresponding through-holes need to be drilled in advance on the large block of material at the cut surface (see FIG. 2A of CN2470923Y for the drill hole positions). After drilling, the through-holes are metallized to form a conductive structure from top to bottom (see again FIG. 2A of CN2470923Y for the conduction state). The arc length of the half of the through-holes after cutting accounts for less than 50% of the total length of the ends, resulting in only a small area of conduction between the electrode and the intermediate thin plate-like resistor component. The measure reduces the conductivity and thermal conductivity of the component and prolongs the response time of overcurrent protection. Moreover, the exposed thin plate-like resistor component on the end face of the component is vulnerable to erosion by solder flux and washing agent during the soldering process onto the circuit board.

In view of the abovementioned shortcomings, another technical document proposes some improvement. China patent application No. CN105976954A, published on Sep. 28, 2016, discloses an overcurrent protection element. The component eliminates the need for drilling and applies a conductive compound to the end face after cutting, forming a first electrical connector and a second electrical connector at both ends. As seen in FIG. 1 of CN105976954A, the upper and lower planes of the component, excluding the electrodes, are covered with a solder mask insulation layer, which is formed before the cutting. Polymer coating layers are also formed on the left and right sides of the component (see FIG. 4 in CN105976954A). However, the structure still has some defects: (1) the electrical connector is composed of a conductive composite compounds with a poor conductivity; (2) the electrical connector has seams between the electrodes and the PPTC composite material, which worsens the reliability of the electrical connection due to thermal expansion and contraction during production and use. Further, the electrical connector is added thereafter, which exacerbates the poor electrical connection.

SUMMARY OF THE INVENTION

In view of this, an objective of the instant disclosure is to provide an overcurrent protection element that overcomes issues of poor conductivity, slow response, and insufficient self-protection during soldering in the existing devices.

To achieve aforementioned objective, the instant disclosure provides an overcurrent protection element comprising: a core material, a first conductive layer, a second conductive layer, an encapsulation layer, a first terminal electrode, and a second terminal electrode.

The core material comprises a top surface, a bottom surface opposite the top surface, a first side surface and a second side surface both located between the top surface and the bottom surface, and a first end surface and a second end surface both located between the top surface and the bottom surface. The first conductive layer is formed on the top surface of the core material, and a second conductive layer is formed on the bottom surface of the core material. The encapsulation layer covers the first conductive layer, the second conductive layer, and at least one of the first side surface and the second side surface. The first terminal electrode is electrically connected to the first conductive layer, and the second terminal electrode is electrically connected to the second conductive layer.

Preferably, in one configuration, the encapsulation layer has a continuous encapsulation structure, wherein the first conductive layer, the second conductive layer, the first side surface, and the second side surface are encapsulated by the encapsulation layer in an annular manner.

In another configuration, the encapsulation layer comprises a first encapsulation layer, a second encapsulation layer, a third encapsulation layer, and a fourth encapsulation layer, respectively covering the first conductive layer, the second conductive layer, the first side surface, and the second side surface. The first encapsulation layer, the second encapsulation layer, the third encapsulation layer, and the fourth encapsulation layer are joined together. There are a seam between the first encapsulation layer and the third encapsulation layer, a seam between the first encapsulation layer and the fourth encapsulation layer, a seam between the second encapsulation layer and the third encapsulation layer, and a seam between the second encapsulation layer and the fourth encapsulation layer.

In further another configuration, the encapsulation layer comprises a first encapsulation layer, a second encapsulation layer, a third encapsulation layer, and a fourth encapsulation layer, respectively covering the first conductive layer, the second conductive layer, the first side surface, and the second side surface. The first encapsulation layer is connected with the third encapsulation layer and the fourth encapsulation layer to form a continuous encapsulation structure, while the second encapsulation layer is joined with the third encapsulation layer and the fourth encapsulation layer. There are a seam between the second encapsulation layer and the third encapsulation layer and a seam between the second encapsulation layer and the fourth encapsulation layer.

In yet another configuration, the encapsulation layer comprises a first encapsulation layer, a second encapsulation layer, a third encapsulation layer, and a fourth encapsulation layer, respectively covering the first conductive layer, the second conductive layer, the first side surface, and the second side surface. The second encapsulation layer is connected with the third encapsulation layer and the fourth encapsulation layer to form a continuous encapsulation structure, while the first encapsulation layer is joined with the third encapsulation layer and the fourth encapsulation layer. There are a seam between the first encapsulation layer and the third encapsulation layer and a seam between the first encapsulation layer and the fourth encapsulation layer.

Specifically, the first conductive layer and the second conductive layer each comprise a metal foil, a metal coating, or a metal plating.

Preferably, the first conductive layer and the second conductive layer each comprise a copper foil, a nickel foil, a nickel-plated copper foil, a tin-plated copper foil, or a nickel-plated stainless steel.

Specifically, the first conductive layer and the second conductive layer may be patterned to expose and uncover part of the core material.

Specifically, the overcurrent protection element comprises multiple insulation parts, wherein one of the insulation parts is embedded in the first conductive layer and located 0 mm to 10 mm from the first end surface, and the other insulation part is embedded in the second conductive layer and located 0 mm to 10 mm from the second end surface.

Specifically, the overcurrent protection element comprises a first insulation film and a second insulation film, the first insulation film is formed on the first conductive layer, and the second insulation film is formed on the second conductive layer.

The material of the insulation parts may be the same as the first insulation film or the second insulation film, wherein the first insulation film and the one of the insulation parts embedded in the first conductive layer may be formed in a continuous structure, i.e., an integral structure, and the insulation film and the other insulation part embedded in the second conductive layer may be formed in a continuous structure, i.e., an integral structure.

Specifically, to improve the adhesive strength and conductivity of the first and the second electrodes on the overcurrent protection element, the overcurrent protection element comprises a third conductive layer and a fourth conductive layer, the third conductive layer is formed on a surface of the first insulation film, extends between the first terminal electrode and the first end surface, and continuously extends to a surface of the second insulation film, and the fourth conductive layer is formed on the surface of the second insulation film, extends between the second terminal electrode and the second end surface, and continuously extends to the surface of the first insulation film.

Specifically, the first terminal electrode and the second terminal electrode are L-shaped, the first terminal electrode extends from the first end surface to part of the bottom surface of the core material, and the second terminal electrode extends from the second end surface to part of the bottom surface of the core material.

Specifically, the first terminal electrode and the second terminal electrode are U-shaped, the first terminal electrode extends from the first end surface to part of the top surface and the bottom surface of the core material, and the second terminal electrode extends from the second end surface to part of the top surface and part of the bottom surface of the core material.

Specifically, the first terminal electrode and the second terminal electrode each comprise a copper layer, a nickel layer, a tin layer, or any combinations thereof. The combinations may be a combination of any two of the above or a combination of the three.

Specifically, the encapsulation layer comprises polyimide, preimpregnated materials, solder mask, silicone resin, fluorine resin, epoxy resin, polyolefin, or any combinations thereof. The combinations may be a combination of any two or more of the above.

Specifically, the first insulation film and the second insulation film each comprise polyimide, preimpregnated materials, solder mask, silicone resin, fluorine resin, epoxy resin, polyolefin, or any combinations thereof. The combinations may be a combination of any two or more of the above.

Specifically, the core material comprises a combination of an upper core material layer and a lower core material layer.

In one of the embodiments, the terminal electrodes are wrapped electrodes, which might be electroplating electrodes, printing electrodes, spraying electrodes, or magnetron sputtering electrodes, such that the terminal electrodes may have excellent conductivity and a fast response when in use.

In one of the embodiments, when the overcurrent protection element of the instant disclosure is mounted onto the circuit board, the area available for soldering may increase, improving the effect of the soldering and electrical connection. Meanwhile, with better conductivity and thermal conductivity, the response time of the overcurrent protection element may be shortened.

The instant disclosure provides the advantageous effect described as follows: since the encapsulation layer partially or entirely encapsulates the overcurrent protection element excluding the terminal electrodes, the encapsulation layer prevents the effect of electro-static and the penetration of water vapor which affects the reliability of the overcurrent protection element. Further, when assembling the overcurrent protection element onto a circuit board, it can withstand the corrosion of chemical solvents such as flux and washing agent.

BRIEF DESCRIPTION OF THE DRAWING(S)

DETAILED DESCRIPTION OF THE PREFERRED EMBODIMENTS

Hereinafter, figures and preferred embodiments are combined for further elaborations. These figures are all simplified schematic diagrams that are used as examples to explain the basic structure of the instant disclosure, and therefore only display the relevant constitutions of the instant disclosure.

Figure 1:
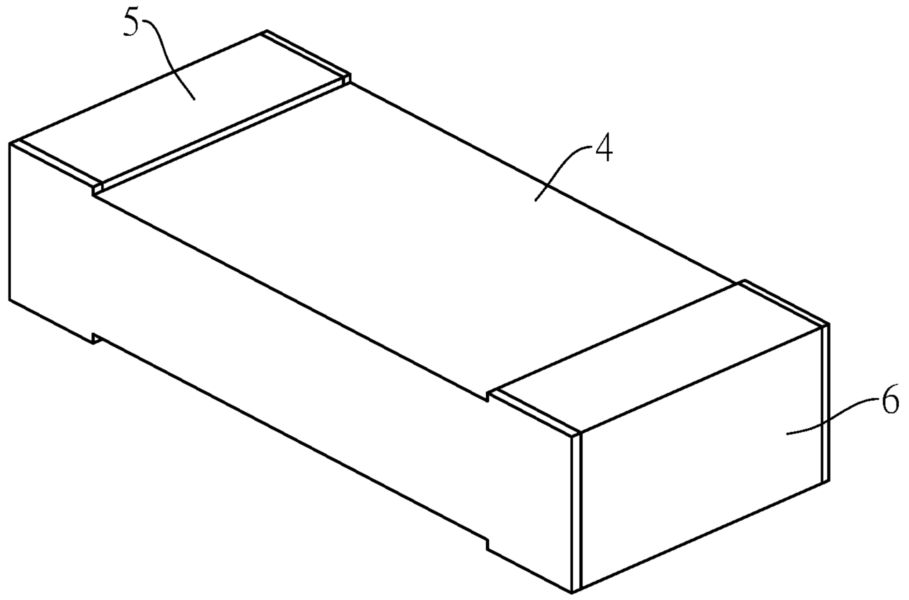
FIG. 1 is a stereogram of an overcurrent protection element of the instant disclosure.

FIG. 1 depicts an exterior appearance of an overcurrent protection element, wherein an encapsulation 4, a first terminal electrode 5, and a second terminal electrode 6 are shown from the exterior appearance. In the following expressions, the length direction indicates the direction between two ends, the width direction indicates the direction between two sides, and the thickness direction indicates the direction between the top and the bottom. As shown in FIGS. 2A to 5A, 8 to 10, the interior structures of the overcurrent protection element each comprises a core material 1, a first conductive layer 2, a second conductive layer 3, the encapsulation layer 4, the first terminal electrode 5, the second terminal electrode 6, a first insulation film 7, and a second insulation film 8. The core material 1 comprises a top surface, a bottom surface opposite the top surface, a first side surface and a second side surface both located between the top surface and the bottom surface, and a first end surface and a second end surface both located between the top surface and the bottom surface. The core material 1 is a rectangular body made of a polymer material and conductive materials dispersed in the polymer material. Specifically, the polymer material may be polytetrafluoroethene, tetrafluoroethylene-hexafluoropropylene copolymer, polytrifluoroethylene, polyvinyl fluoride, polyvinylidene fluoride, polyethylene, chlorinated polyethylene, oxidized polyethylene, polyvinyl chloride, butadiene-acrylonitrile copolymer, acrylonitrile-butadiene-styrene copolymer, polystyrene, polycarbonate, polyamide, polyimide, polyethylene terephthalate, polybutylene terephthalate, polyphenylene ether, polyphenylene sulfide, polyoxymethylene, phenolic resin, maleic anhydride grafted polyethylene, polypropylene, polyvinylidene fluoride, epoxy resin, ethylene-vinyl acetate copolymer, polymethyl methacrylate, ethylene-acrylic acid copolymer, or a mixture of any two or more of the abovementioned materials. The conductive material may be carbon black, metal carbide, metal, or a mixture of any two or more of the abovementioned materials.

As in FIG. 2A to 5A, the first conductive layer 2 is formed on the top surface of the core material 1 and extends to the first end surface of the core material 1. The second conductive layer 3 is formed on the bottom surface of the core material 1 and extends to the second end surface of the core material 1. The two conductive layers may not extend to each end surface as well.

The encapsulation layer 4 covers the first conductive layer 2, the second conductive layer 3, and at least one of the foresaid side surfaces (the first and second side surfaces). The encapsulation layer 4 has four different encapsulation structures as follows.

Figure 2A:
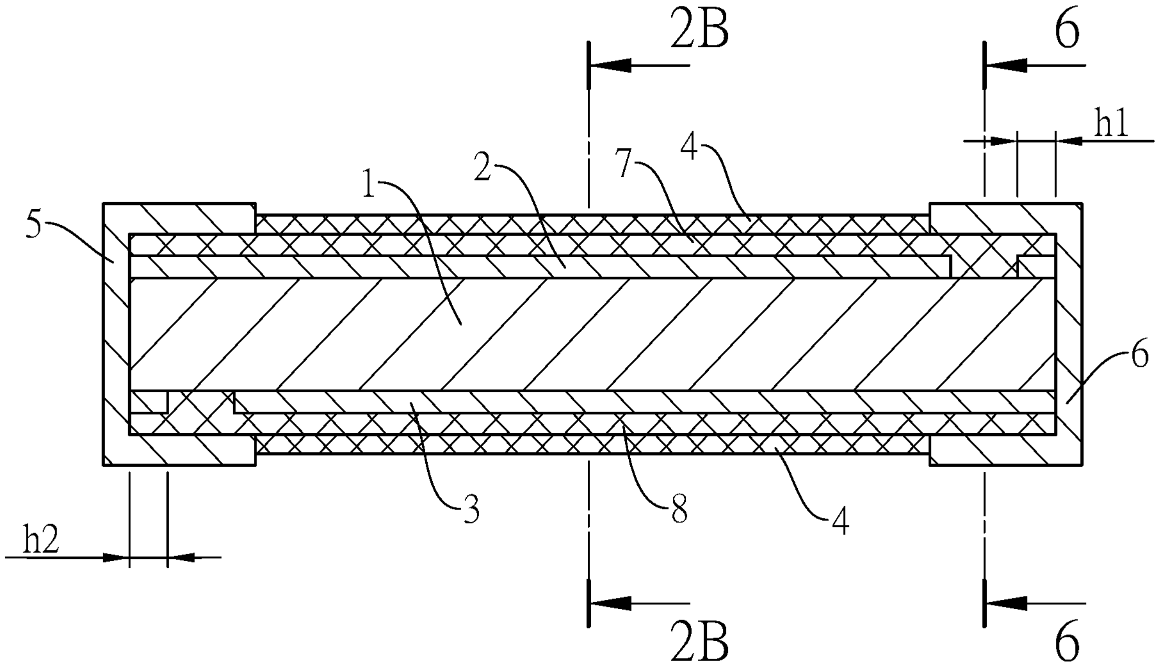
FIG. 2A is a cross-sectional view of the overcurrent protection element having a first structure of an encapsulation layer.
Figure 2B:
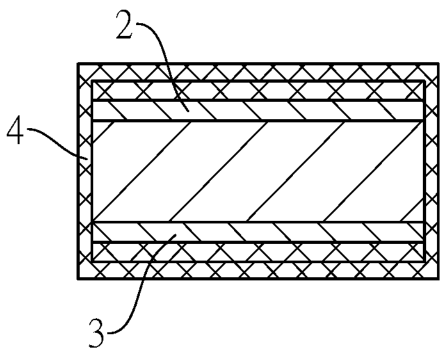
FIG. 2B is a cross-sectional view of a first structure across line 2B-2B in FIG. 2A.

The first structure is shown in FIGS. 2A and 2B, i.e., the encapsulation layer 4 is a continuous encapsulation structure, and the first conductive layer 2, the second conductive layer 3, the first side surface, and the second side surface are encapsulated in an annular manner.

Figure 3A:
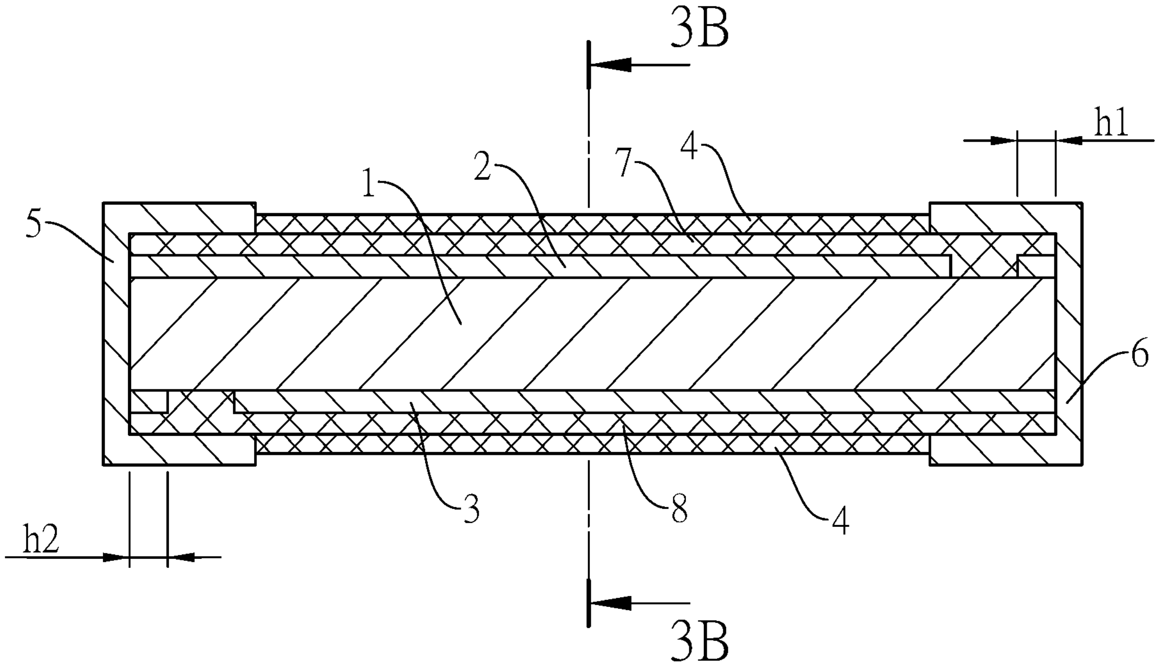
FIG. 3A is a cross-sectional view of the overcurrent protection element having a second structure of an encapsulation layer.
Figure 3B:
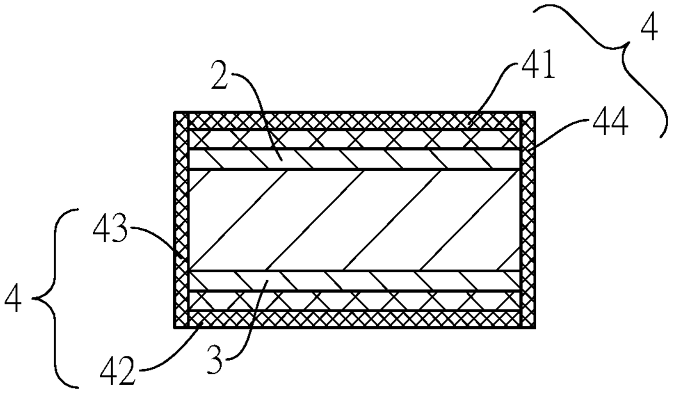
FIG. 3B is a cross-sectional view of a second structure across line 3B-3B in FIG. 3A.

The second structure is shown in FIGS. 3A and 3B, i.e., the encapsulation layer 4 comprises a first encapsulation layer 41, a second encapsulation layer 42 opposite the first encapsulation layer 41, a third encapsulation layer 43, and a fourth encapsulation layer 44 opposite the third encapsulation layer 43, respectively covering the first conductive layer 2, the second conductive layer 3, the first side surface, and the second side surface. The first encapsulation layer 41, the second encapsulation layer 42, the third encapsulation layer 43, and the fourth encapsulation layer 44 are joined together. There are a seam between the first encapsulation layer 41 and the third encapsulation layer 43, a seam between the first encapsulation layer 41 and the fourth encapsulation layer 44, a seam between the second encapsulation layer 42 and the third encapsulation layer 43, and a seam between the second encapsulation layer 42 and the fourth encapsulation layer 44.

Figure 4A:
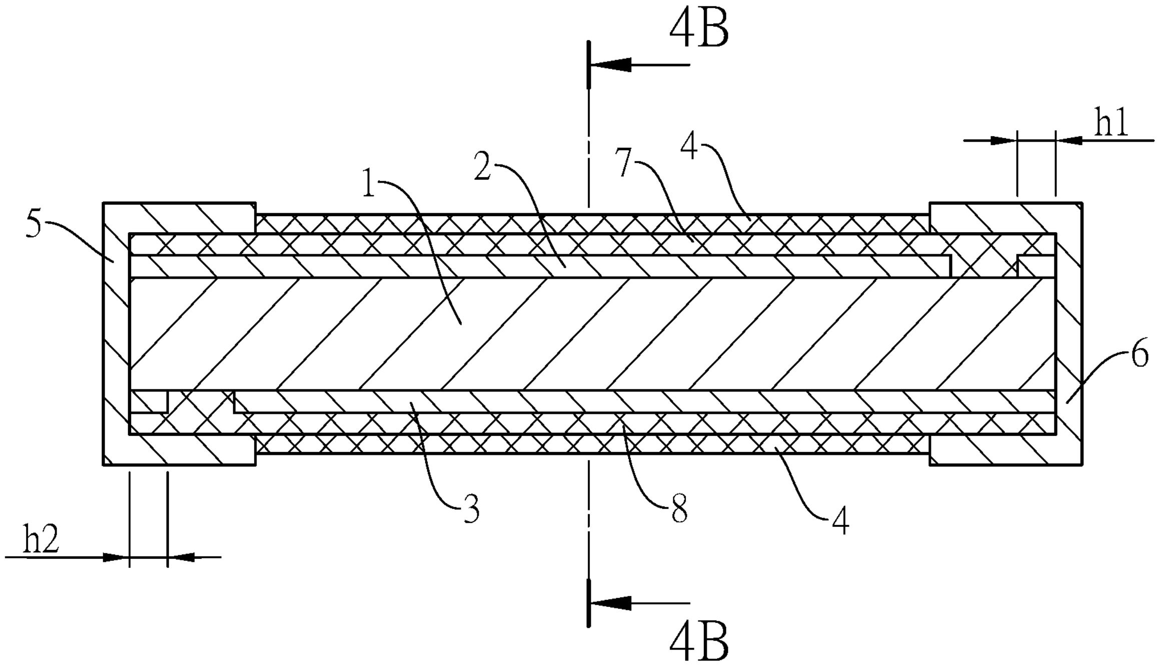
FIG. 4A is a cross-sectional view of the overcurrent protection element having a third structure of an encapsulation layer.
Figure 4B:
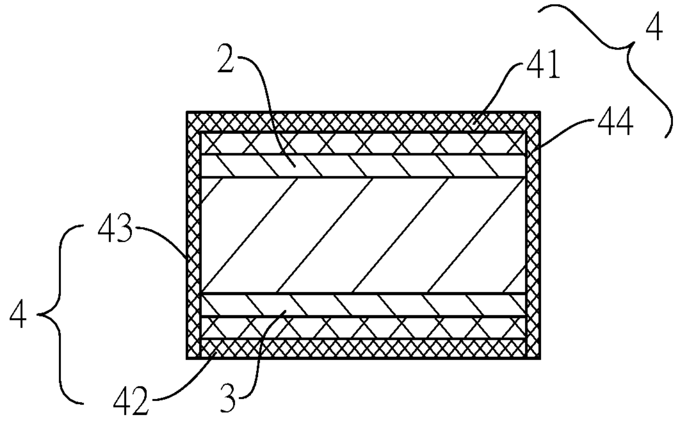
FIG. 4B is a cross-sectional view of a third structure across line 4B-4B in FIG. 4A.

The third structure is shown in FIGS. 4A and 4B, i.e., the encapsulation layer 4 comprises a first encapsulation layer 41, a second encapsulation layer 42 opposite the first encapsulation layer 41, a third encapsulation layer 43, and a fourth encapsulation layer 44 opposite the third encapsulation layer 43, respectively covering the first conductive layer 2, the second conductive layer 3, the first side surface, and the second side surface, wherein the first encapsulation layer 41 is connected with the third encapsulation layer 43 and the fourth encapsulation layer 44 to form a continuous encapsulation structure, and the second encapsulation layer 42 is joined with the third encapsulation layer 43 and the fourth encapsulation layer 44. There are a seam between the second encapsulation layer 42 and the third encapsulation layer 43 and a seam between the second encapsulation layer 42 and the fourth encapsulation layer 44.

Figure 5A:
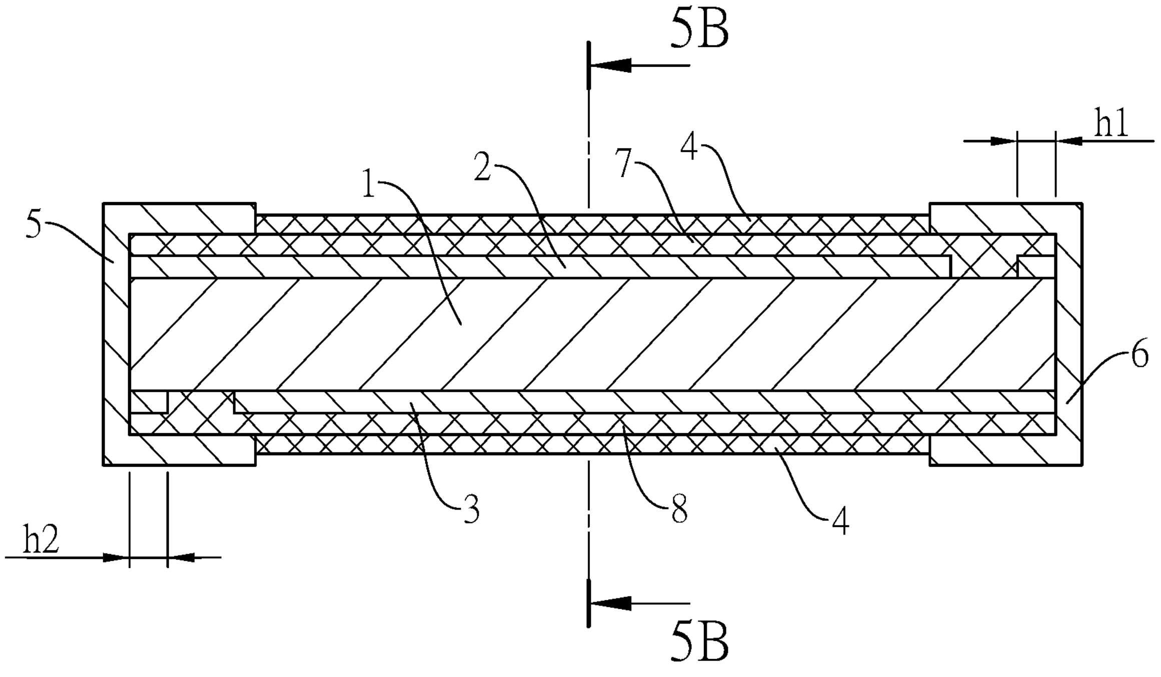
FIG. 5A is a cross-sectional view of the overcurrent protection element having a fourth structure of an encapsulation layer.
Figure 5B:
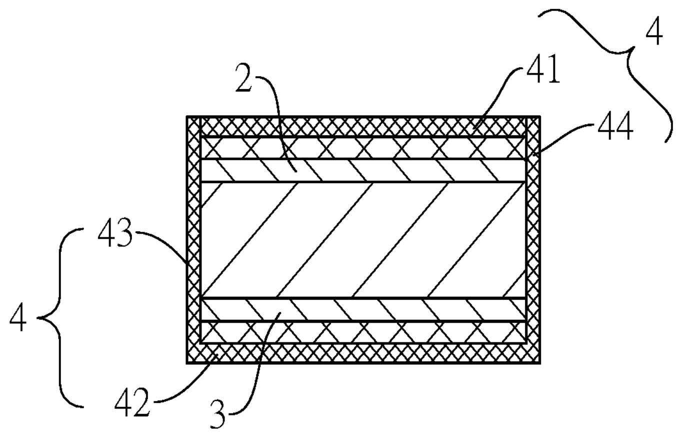
FIG. 5B is a cross-sectional view of a fourth structure across line 5B-5B in FIG. 5A.

The fourth structure is shown in FIGS. 5A and 5B, i.e., the encapsulation layer comprises a first encapsulation layer 41, a second encapsulation layer 42 opposite the first encapsulation layer 41, a third encapsulation layer 43, and a fourth encapsulation layer 44 opposite the third encapsulation layer 43, respectively covering the first conductive layer 2, the second conductive layer 3, the first side, and the second side, and the second encapsulation layer 42 is connected with the third encapsulation layer 43 and the fourth encapsulation layer 44 to form a continuous encapsulation structure, and the first encapsulation layer 41 is joined with the third encapsulation layer 43 and the fourth encapsulation layer 44. There are a seam between the first encapsulation layer 41 and the third encapsulation layer 43 and a seam between the first encapsulation layer 41 and the fourth encapsulation layer 44.

Figure 7:
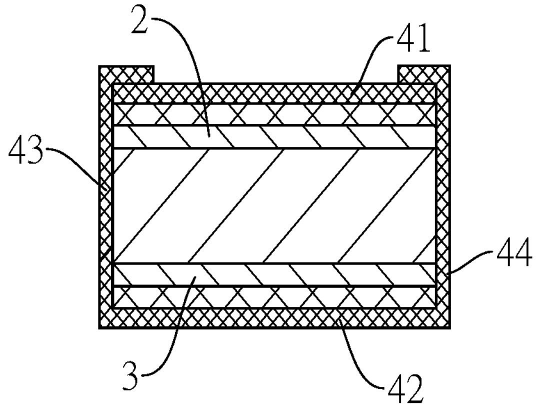
FIG. 7 is a schematic diagram of the overcurrent protection element of the instant disclosure comprising an overlapping structure.

The abovementioned joint configurations may be the connection forms illustrated in FIGS. 3B to 5B, and the overlapping form as illustrated in FIG. 7. FIG. 7 shows an overlapping form obtained from the variation based on FIG. 5B. The overlapping form comprises a continuous encapsulation structure formed by connecting the second encapsulation layer 42 with the third encapsulation layer 43 and the fourth encapsulation layer 44. The first encapsulation layer 41, the second encapsulation layer 42, the third encapsulation layer 43, and the fourth encapsulation layer 44 respectively cover the first conductive layer 2, the second conductive layer 3, the first side, and the second side. The continuous encapsulation structure overlaps parts of the first encapsulation layer 41 and extends from a part of the surface of the first encapsulation layer 41 to another part of the surface of the first encapsulation layer 41. That is, there are overlapping parts between the first encapsulation layer 41 and the third encapsulation layer 43 and between the first encapsulation layer 41 and the fourth encapsulation layer 44.

As shown in FIGS. 2A to 5A, the first terminal electrode 5 is formed on the first end surface and electrically connected to the first conductive layer 2. The second terminal electrode 6 is formed on the second end surface and electrically connected to the second conductive layer 3.

The first conductive layer 2 and the second conductive layer 3 each comprise a metal foil, a metal coating, or a metal plating. The first conductive layer 2 and the second conductive layer 3 each may be a copper foil, an electroplating film, a metal plating, or a metal printing film, wherein, the copper foil may be selected as a nickel-plated copper foil.

The first insulation film 7 is formed on the first conductive layer 2, and the second insulation film 8 is formed on the second conductive layer 3.

After patterning the first conductive layer 2 and the second conductive layer 3, the core material 1 is partially uncovered.

Figure 6:
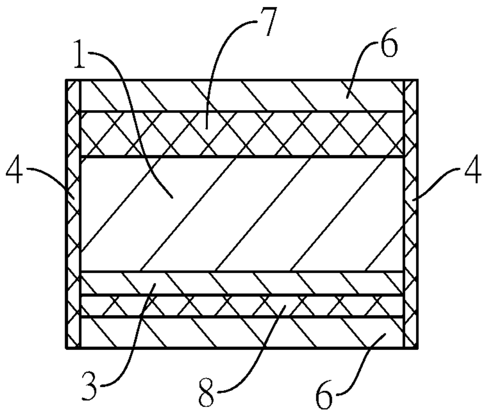
FIG. 6 is a cross-sectional view across line 6-6 in FIG. 2A.

Still as shown in FIGS. 2A to 5A, the overcurrent protection element comprises multiple insulation parts, wherein one of the insulation parts is embedded in the first conductive layer 2, and the distance h1, which is the distance between its side near to the second end surface and the second end surface, ranges from 0 mm to 10 mm, and the other insulation part is embedded in the second conductive layer 3, and the distance h2, which is the distance between its side near to the first end surface and the first end surface, ranges from 0 mm to 10 mm. As shown in FIGS. 2A to 5A, the insulation film 7 and the one of the insulation parts embedded in the first conductive layer 2 may be formed in a continuous structure, i.e., an integral structure, and the insulation film 8 and the other insulation part embedded in the second conductive layer 3 may be formed in a continuous structure, i.e., an integral structure. Preferably, the h1 and the h2 are each 1 mm to 5 mm. The cross-sectional view of one of the insulation parts along the width direction of the overcurrent protection element is shown in FIG. 6, and the core material 1, the second conductive layer 3, the encapsulation layer 4, the second terminal electrode 6, the first insulation film 7, and the second insulation film 8 are labeled in FIG. 6. The width of the insulation part itself is 0.05 mm to 5 mm.

Figure 8:
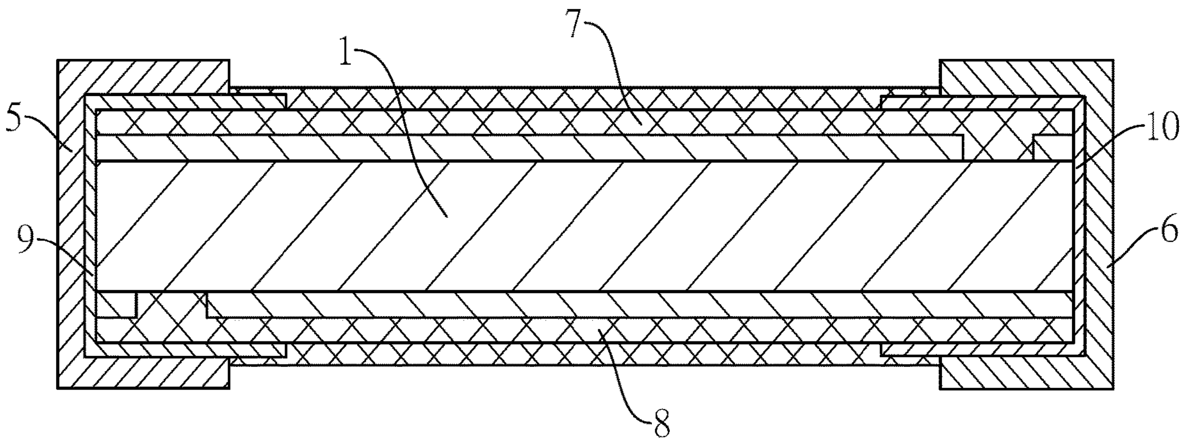
FIG. 8 is a schematic diagram of an overcurrent protection element of the instant disclosure comprising a third conductive layer and a fourth conductive layer.

As shown in FIG. 8, the overcurrent protective component comprises a third conductive layer 9 and a fourth conductive layer 10. The third conductive layer 9 is formed on a surface of the first insulation film 7, extends between the first terminal electrode 5 and the first end surface, and continuously extends to the surface of the second insulation film 8.

The fourth conductive layer 10 is formed on a surface of the second insulation film 8, extends between the second terminal electrode 6 and the second end surface, and continuously extends to the surface of the first insulation film 7. The third conductive layer 9 and the fourth conductive layer 10 are approximately U-shaped. The third conductive layer 9 and the fourth conductive layer 10 each may be electroplated copper layers. The electroplated layers can achieve an excellent contact conductivity and are each presented in one-piece. Therefore, the third conductive layer 9 and the fourth conductive layer 10 are conductive layers between the first terminal electrode 5 and the core material 1 and between the second terminal electrode 6 and the core material 1, which are installed for the purpose of improving conductivity and the contact reliability between the terminal electrodes and the other U-shaped conductive elements.

The terminal electrodes can have different structures as shown in FIGS. 2A to 5A, where the first terminal electrode 5 and the second terminal electrode 6 are U-shaped. The first terminal electrode 5 extends from the first end surface to part of the top surface and part of the bottom surface of the core material 1, and the second terminal electrode 6 extends from the second end surface to part of the top surface and part of the bottom surface of the core material 1.

Figure 9:
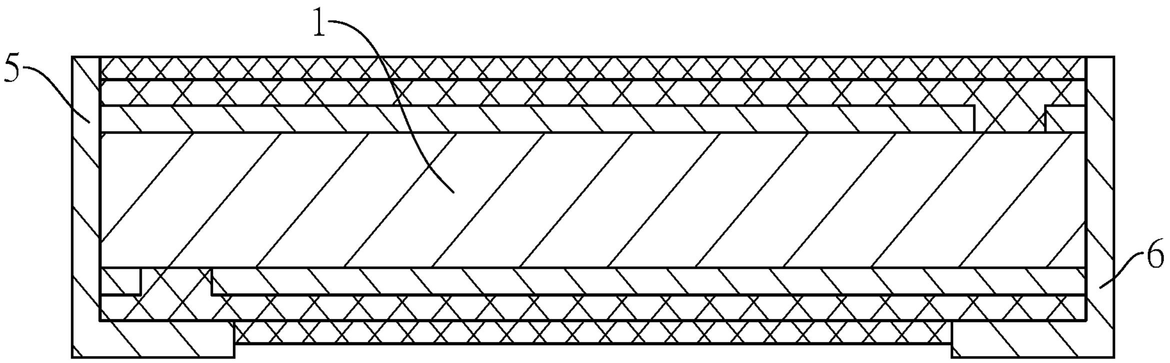
FIG. 9 is a schematic diagram of L-shaped terminal electrodes of the overcurrent protection element of the instant disclosure.

The terminal electrodes can also have another structure as shown in FIG. 9, where the first terminal electrode 5 and the second terminal electrode 6 are L-shaped. The first terminal electrode 5 extends from the first end surface to part of the bottom surface of the core material 1, and the second terminal electrode 6 extends from the second end surface to part of the bottom surface of the core material 1.

The first terminal electrode 5 and the second terminal electrode 6 each can be a copper layer, a nickel layer, a tin layer, a combination of any two of the above, or a combination of the three.

The encapsulation layer 4 may be polyimide, preimpregnated materials, solder mask, silicone resin, fluorine resin, epoxy resin, polyolefin, or a combination of any two or more of the above.

The first insulation film 7 and the second insulation film 8 each can be polyimide, preimpregnated material, solder mask, silicone resin, fluorine resin, epoxy resin, polyolefin, or a combination of any two or more of the above.

Figure 10:
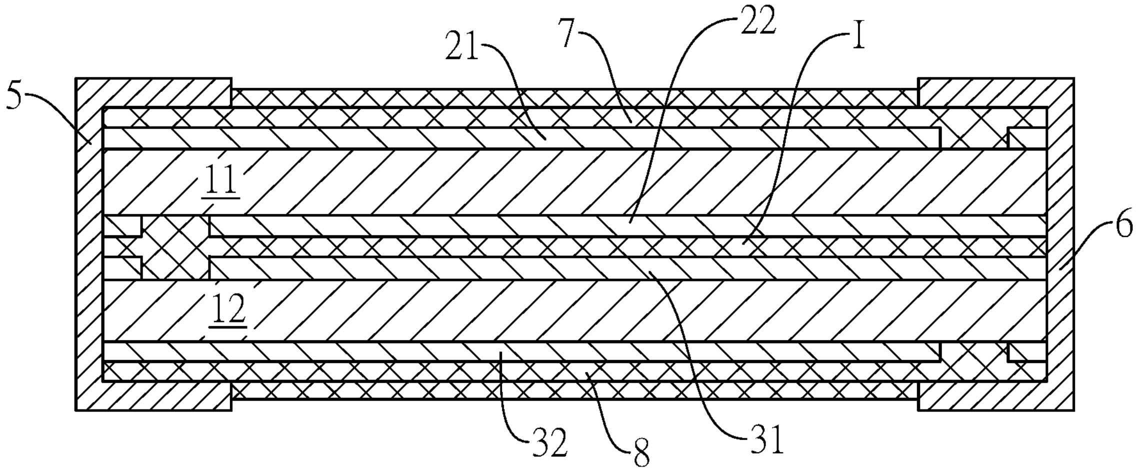
FIG. 10 is a schematic diagram of a core material of an overcurrent protection element of the instant disclosure having a combined structure.
Figure 11:
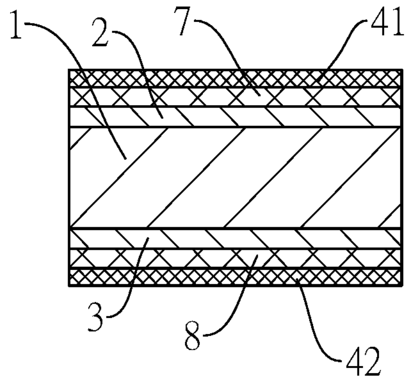
FIG. 11 is a cross-sectional view of an encapsulation condition of Comparative Example 1 and 2.

To accomplish various electrical properties of the thermistor, the core material may comprise a combination of an upper core material layer 11 and a lower core material layer 12. As shown in FIG. 10, there are an upper first conductive layer 21 and a lower first conductive layer 22 on the upper and lower surfaces adjacent to the upper core material layer 11, and there are an upper second conductive layer 31 and a lower second conductive layer 32 on the upper and lower surfaces adjacent to the lower core material layer 12. The first insulation film 7 covers the upper first conductive layer 21, the second insulation film 8 covers the lower second conductive layer 32, and a third insulation film I separates the lower first conductive layer 22 and the upper second conductive layer 31. The upper core material layer 11 and the lower core material layer 12 are arranged in parallel between the first terminal electrode 5 and the second terminal electrode 6. The upper surface of the upper core material layer 11 and the lower surface of the lower core material layer 12 are electrically connected to the first terminal electrode 5, and the lower surface of the upper core material layer 11 and the upper surface of the lower core material layer 12 are electrically connected to the second terminal electrode 6. The positions of the insulation parts of the conductive layers depend on the requirement of the electrical connection, which is, if the upper and lower insulation parts are on the same end, then the two intermediate insulation parts are on the opposite end; further, the upper core material layer 11 and the lower core material layer 12 are using different polymer materials and/or conductive materials The material of the encapsulation layer 4 may be the same as the polymer material of the core material 1. In another embodiment, for example, the polymer material of the core material 1 is polyvinylidene fluoride, and the material of the encapsulation layer 4 is fluorine resin, so as to make the side of the encapsulation layer 4 fused well with the side of the core material 1. Two Comparative Examples and two Examples with different compositions of the core materials and encapsulation conditions are provided to compare the effect of a thermistor resisting the environmental impact. The encapsulation conditions of Comparative Example 1 (CE1) and Comparative Example 2 (CE2) are both encapsulation layers covering the first conductive layer and the second conductive layer without covering any side surfaces, as shown in FIG. 11, wherein the core material 1, the first conductive layer 2, the second conductive layer 3, the first insulation film 7, the second insulation film 8, the encapsulation layer 41 covering the first insulation film 7, and the encapsulation layer 42 covering the second insulation film 8 are presented. The encapsulation conditions of Example 1 (E1) and Example 2 (E2) are both encapsulation layers covering the first conductive layer, the second conductive layer, the first side surface, and the second side surface, and the encapsulation structures of both E1 and E2 are the same as in FIG. 4A and FIG. 4B. The materials used in Comparative Examples 1 and 2 and Examples 1 and 2 are shown in Table 1.

TABLE 1 the composition of the core materials of the two Examples and the two Comparative Examples.

| | CE1 | E1 | CE2 | E2 |
|---|---|---|---|---|
| Polyvinylidene fluoride | 60% | 60% | | |
| High density polyethylene | | | 56% | 56% |
| Carbon black | 30% | 30% | 40% | 40% |
| Polytetrafluoroethene powder | 6% | 6% | | |
| TAIC crosslinking agent (Triallyl isocyanurate) | 2% | 2% | 2% | 2% |
| Calcium carbonate | 2% | 2% | 2% | 2% |

TABLE 2 results of the double 85 test

| | CE1 | E1 | CE2 | E2 |
|---|---|---|---|---|
| R0 (mΩ) | 146.3 | 144.7 | 74.5 | 77.9 |
| R1 (mΩ) | 270.7 | 169.3 | 156.5 | 98.2 |
| R1/R0 | 1.85 | 1.17 | 2.1 | 1.26 |

In Table 2, R0 represents the initial resistance of the overcurrent protection element at room temperature, and R1 represents the resistance of the overcurrent protection element which is maintained for over 1000 hours under 85% humidity and 85° C. R0/R1 represents the variation rate of the double 85 test. A smaller variation rate indicates better endurance ability to extreme environment impact.

According to Table 2, without encapsulating any sides of the overcurrent protection element, Comparative Examples 1 and 2 have a worse endurance under an extreme environment than Examples 1 and 2. The overcurrent protection element of the instant disclosure is capable of providing sufficient self-protection and excellent reliability to extreme environment impact.

Some further explanations of the design principles of the instant disclosure are provided as follows.

Since the instant disclosure aims to overcome the resulting drawbacks when cutting a large block of material and yet to retain some process during the production of the large block material, insulation parts are installed on and embedded in the first and second conductive layers respectively. In the instant disclosure, there remains a small part of the conductive layers between the insulation parts and the neighboring end surfaces. This is because if the insulation part is established after the conductive layer has been fully applied, some locational deviations would be present in the disconnected insulation parts. The design ensures that the adjacent end surfaces of the neighboring overcurrent protection element has exposed conductive layers with an easy creation of the insulation part after the cutting process and that the electrodes and the conductive layers can perform sufficient electrical connection during electrode coating.

For clarity, the thickness in the figures is enlarged, and the thicknesses of the first and second conductive layers are relatively thinner. The first and second insulation films are thin layers solidified by a composite of fiber fabric and insulating resin. The insulation films are thermally compressed onto the conductive layers, such that the insulation films can be embedded into the conductive layers to form the insulation parts, as shown in FIGS. 2A to 5A.

The above description is merely some specific embodiments of the instant disclosure. The various examples shall not limit the essential content of the instant disclosure. A person having ordinary skill in the art, after reading the specification, can make modifications or variations of the specific embodiments as abovementioned without departing from the essence and scope of the instant disclosure.

What is claimed is:

1. An overcurrent protection element, comprising:

a core material comprising a top surface, a bottom surface opposite the top surface, a first side surface and a second side surface both located between the top surface and the bottom surface, and a first end surface and a second end surface both located between the top surface and the bottom surface;

a first conductive layer formed on the top surface of the core material;

a second conductive layer formed on the bottom surface of the core material;

an encapsulation layer covering the first conductive layer, the second conductive layer, and at least one of the first side surface and the second side surface;

a first terminal electrode electrically connected to the first conductive layer; and a second terminal electrode electrically connected to the second conductive layer;

wherein the overcurrent protection element comprises a first insulation film and a second insulation film, the first insulation film is formed on the first conductive layer, and the second insulation film is formed on the second conductive layer;

wherein the overcurrent protection element comprises a third conductive layer and a fourth conductive layer, the third conductive layer is formed on a surface of the first insulation film, extends between the first terminal electrode and the first end surface, and continuously extends to a surface of the second insulation film, and the fourth conductive layer is formed on the surface of the second insulation film, extends between the second terminal electrode and the second end surface, and continuously extends to the surface of the first insulation film.

2. The overcurrent protection element as claimed in claim 1, wherein the encapsulation layer is a continuous encapsulation structure, and the first conductive layer, the second conductive layer, the first side surface, and the second side surface are encapsulated by the encapsulation layer in an annular manner.

3. The overcurrent protection element as claimed in claim 1, wherein the encapsulation layer comprises a first encapsulation layer, a second encapsulation layer, a third encapsulation layer, and a fourth encapsulation layer, respectively covering the first conductive layer, the second conductive layer, the first side surface, and the second side surface, there are multiple seams: a seam between the first encapsulation layer and the third encapsulation layer, a seam between the first encapsulation layer and the fourth encapsulation layer, a seam between the second encapsulation layer and the third encapsulation layer, and a seam between the second encapsulation layer and the fourth encapsulation layer.

4. The overcurrent protection element as claimed in claim 1, wherein the encapsulation layer comprises a first encapsulation layer, a second encapsulation layer, a third encapsulation layer, and a fourth encapsulation layer, respectively covering the first conductive layer, the second conductive layer, the first side surface, and the second side surface, wherein the first encapsulation layer is connected with the third encapsulation layer and the fourth encapsulation layer to form a continuous encapsulation structure, and there are multiple seams: a seam between the second encapsulation layer and the third encapsulation layer and a seam between the second encapsulation layer and the fourth encapsulation layer.

5. The overcurrent protection element as claimed in claim 1, wherein the encapsulation layer comprises a first encapsulation layer, a second encapsulation layer, a third encapsulation layer, and a fourth encapsulation layer, respectively covering the first conductive layer, the second conductive layer, the first side surface, and the second side surface, wherein the second encapsulation layer is connected with the third encapsulation layer and the fourth encapsulation layer to form a continuous encapsulation structure, and there are multiple seams: a seam between the first encapsulation layer and the third encapsulation layer and a seam between the first encapsulation layer and the fourth encapsulation layer.

6. The overcurrent protection element as claimed in claim 1, wherein the first conductive layer and the second conductive layer each comprise a metal foil, a metal coating, or a metal plating.

7. The overcurrent protection element as claimed in claim 6, wherein the first conductive layer and the second conductive layer each comprise a nickel-plated copper foil.

8. The overcurrent protection element as claimed in claim 1, wherein the overcurrent protection element comprises multiple insulation parts, wherein one of the insulation parts is embedded in the first conductive layer and located 0 mm to 10 mm from the second end surface, and another of the insulation parts is embedded in the second conductive layer and located 0 mm to 10 mm from the first end surface.

9. The overcurrent protection element as claimed in claim 1, wherein the first terminal electrode and the second terminal electrode are L-shaped, the first terminal electrode extends from the first end surface to part of the bottom surface of the core material, and the second terminal electrode extends from the second end surface to part of the bottom surface of the core material.

10. The overcurrent protection element as claimed in claim 1, wherein the first terminal electrode and the second terminal electrode are U-shaped and extend from the first end surface and the second end surface to part of the top surface and part of the bottom surface of the core material.

11. The overcurrent protection element as claimed in claim 1, wherein the first terminal electrode and the second terminal electrode each comprise a copper layer, a nickel layer, a tin layer, or any combinations thereof.

12. The overcurrent protection element as claimed in claim 1, wherein the encapsulation layer includes polyimide, preimpregnated materials, solder mask, silicone resin, fluorine resin, epoxy resin, polyolefin, or any combinations thereof.

13. The overcurrent protection element as claimed in claim 1, wherein the first insulation film and the second insulation film each comprise polyimide, preimpregnated materials, solder mask, silicone resin, fluorine resin, epoxy resin, polyolefin, or any combinations thereof.

14. The overcurrent protection element as claimed in claim 1, wherein the core material comprises a combination of an upper core material layer and a lower core material layer.

* * * * *